United States Patent [19]

Cortese

[11] Patent Number: 4,632,024
[45] Date of Patent: Dec. 30, 1986

[54] COFFEE MACHINE

[75] Inventor: Virgino Cortese, Turin, Italy

[73] Assignee: Essegielle S.r.l., Turin, Italy

[21] Appl. No.: 806,250

[22] Filed: Dec. 5, 1985

[30] Foreign Application Priority Data

Sep. 23, 1985 [IT] Italy ............................... 53835/85[U]

[51] Int. Cl.⁴ .............................................. A47J 31/54
[52] U.S. Cl. ......................................... 99/293; 99/300
[58] Field of Search ................. 99/279, 283, 293, 294, 99/300; 126/369, 381

[56] References Cited

U.S. PATENT DOCUMENTS

| | | | | |
|---|---|---|---|---|
| 2,745,334 | 5/1956 | Schwall | ............................. | 99/294 X |
| 4,204,465 | 5/1980 | Knecht | ................................. | 99/293 |
| 4,287,817 | 9/1981 | Moskowitz | ....................... | 99/293 X |
| 4,502,371 | 3/1985 | Di Lascio | ............................. | 99/293 |

FOREIGN PATENT DOCUMENTS

| | | | | |
|---|---|---|---|---|
| 1031637 | 6/1953 | France | ................................. | 99/294 |
| 267502 | 9/1929 | Italy | ..................................... | 99/294 |

Primary Examiner—Billy J. Wilhite
Attorney, Agent, or Firm—David A. Jackson

[57] ABSTRACT

Coffee machine on which a boiler, heated by an electric heating source, is connected by a top and bottom pipe respectively to two inlets on a distribution chamber, the latter having an exhaust outlet, a water outlet connected to a ground coffee filtering cup, and a steam outlet. A selecting device is mounted in mobile manner inside the said distribution chamber for enabling selective communication between the water and exhaust outlets, while at the same time disabling the said heating source, between the bottom pipe and the water outlet, and between the top pipe and the steam outlet.

9 Claims, 9 Drawing Figures

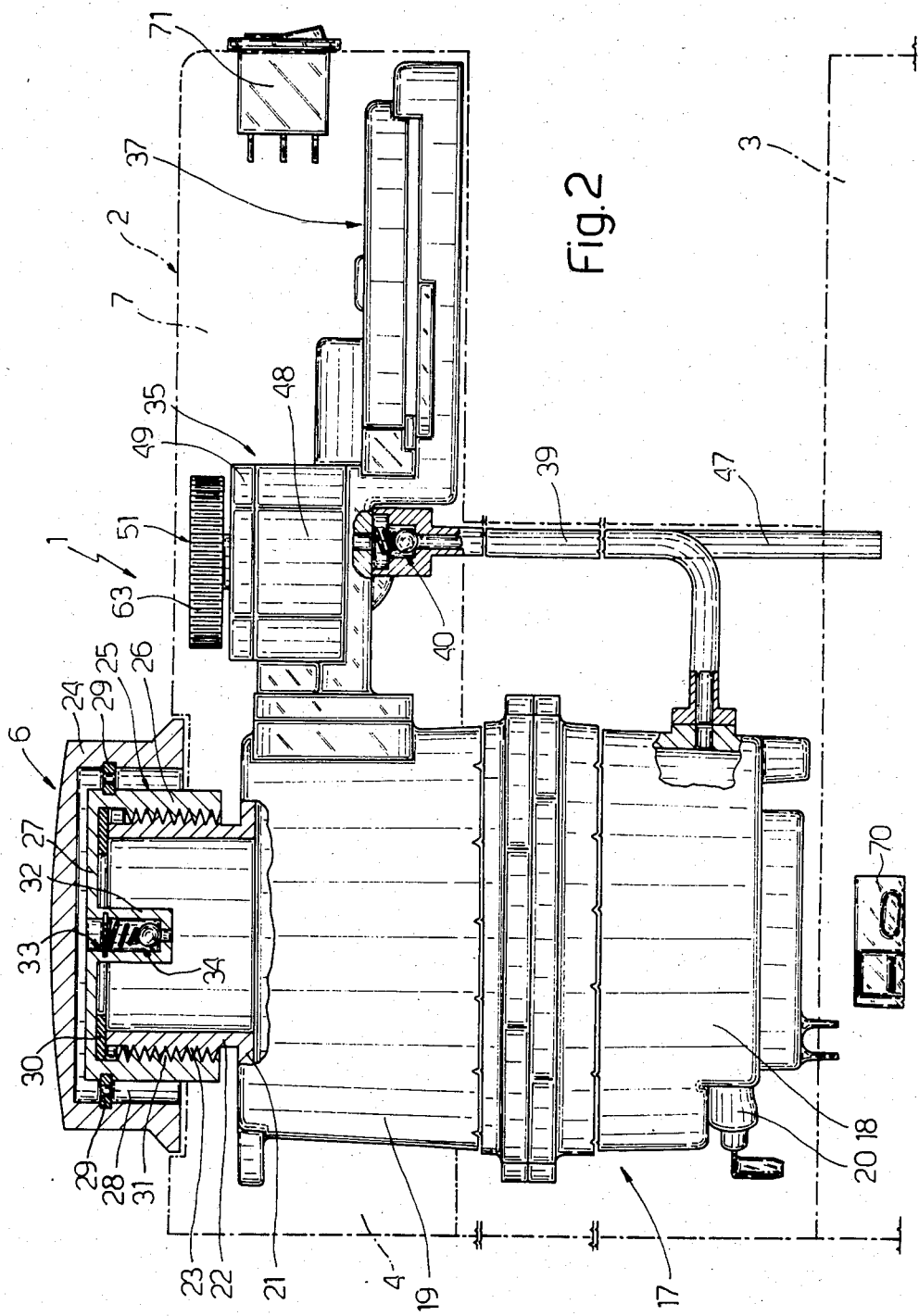

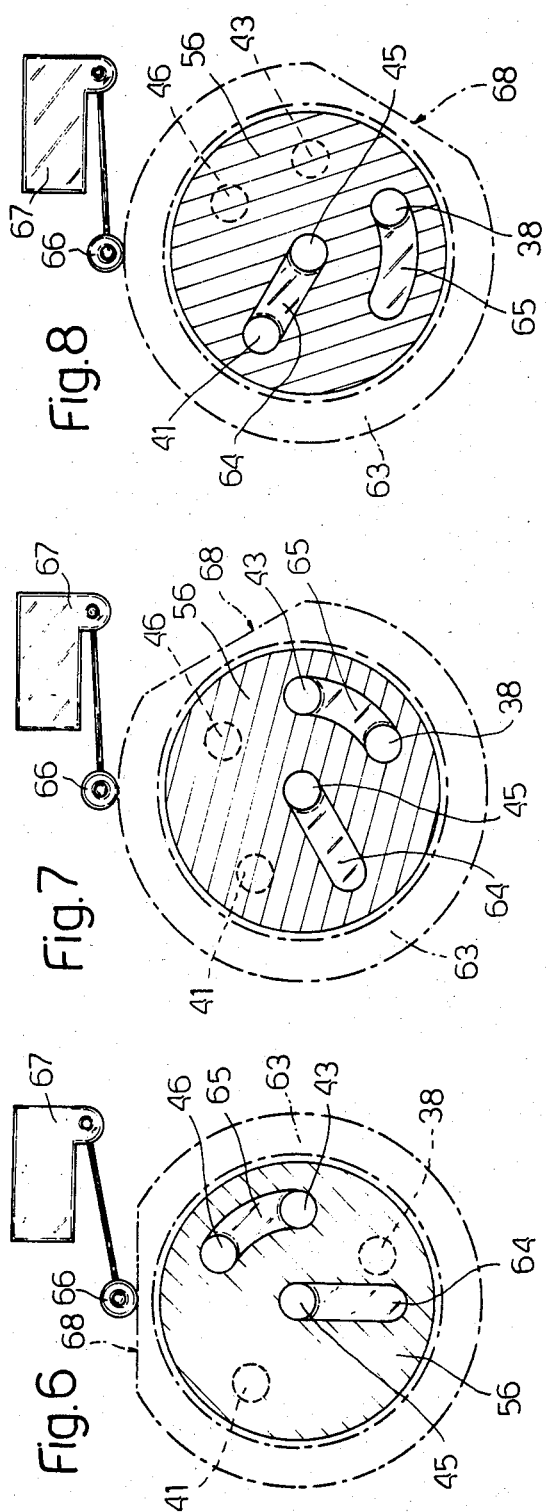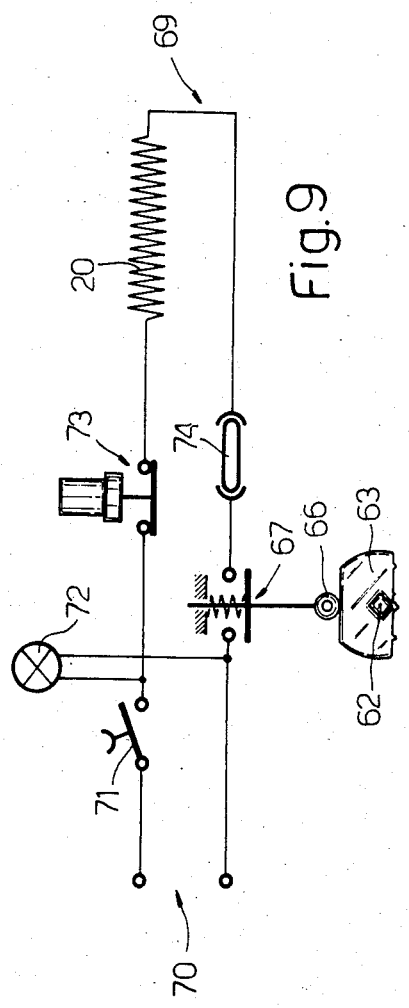

COFFEE MACHINE

BACKGROUND OF THE INVENTION

The present invention relates to a coffee machine in general and, in particular, to a coffee machine on which a given quantity of water inside a boiler is forced through ground coffee as a result of the overpressure formed inside the boiler when a heating source connected to the boiler is activated. The ground coffee is contained inside a filtering cup connected to a first outlet on the said boiler, a second outlet of which may be connected to an essentially-dry-steam supply nozzle.

On known coffee machines of the aforementioned type, activation of the boiler heating source results, after a given length of time, in practically all the water inside the boiler being forced through the ground coffee inside the filtering cup, and in the production of an equivalent amount of liquid coffee which is collected inside a vessel (possibly heatable) prior to being served in cups.

Known coffee machines of the aforementioned type involve a number of functional drawbacks, owing to the fact that practically all the water inside the boiler is fed through the coffee in one go, with no possibility of interrupting perculation other than by disconnecting the heating source.

As a result, the coffee is of inferior quality; a heated vessel is needed for collecting the left-over coffee; and practically no dry steam can be produced afterwards, as all the water in the boiler has been used up.

SUMMARY OF THE INVENTION

The aim of the present invention is to provide a coffee machine involving none of the aforementioned drawbacks, i.e. one designed to produce superior quality coffee, in the exact number of cups required by the user, while at the same time preserving enough left-over water inside the boiler for producing a given quantity of steam. With this aim in view, the present invention relates to a coffee machine comprising a boiler, a heating source connected to the said boiler, a first outlet pipe extending from a bottom portion of the said boiler, a second outlet pipe extending from a top portion of the said boiler, a steam supply nozzle, a removable filtering cup containing sufficient ground coffee for producing at least one cup of drinking coffee, and a distributor located, on one side, between the said first and second pipes, and, on the other, between the said steam supply nozzle and the said filtering cup; characterised by the fact that the said distributor comprises a distribution chamber having a first and second inlet communicating with the said first and second pipes, and at least one first and second outlet communicating respectively with the said filtering cup and the said nozzle; and selecting means housed in mobile manner inside the said chamber for selectively assuming at least two distinct operating positions, in the first of which, the said first inlet communicates with the said first outlet, and in the second of which, the said second inlet communicates with the said second outlet; the size of the said boiler being such as to hold enough water for making at least twice the number of cups catered for by the ground coffee contained inside the said filtering cup.

To prevent water under pressure from being supplied when the filtering cup is removed, a preferred embodiment of the present invention also comprises an exhaust and a third outlet located on the said distribution chamber and communicating with the said exhaust; the said selecting means being designed to assume a third operating position enabling communication between the said first and third outlets; and control means being provided for disabling the said heating source when the said selecting means are in the said thord operating position.

BRIEF DESCRIPTION OF THE DRAWINGS

A non-limiting arrangement of the present invention will now be described with reference to the attached drawings in which:

FIG. 2 shows a partially-sectioned side view of the operating mechanism inside the FIG. 1 machine;

FIGS. 6, 7 and 8 show schematic plan views of a FIG. 4 and 5 detail in three different operating positions;

FIG. 9 shows an electric diagram of the control circuit on the FIG. 1 machine.

DETAILED DESCRIPTION OF THE INVENTION

Figure 1:
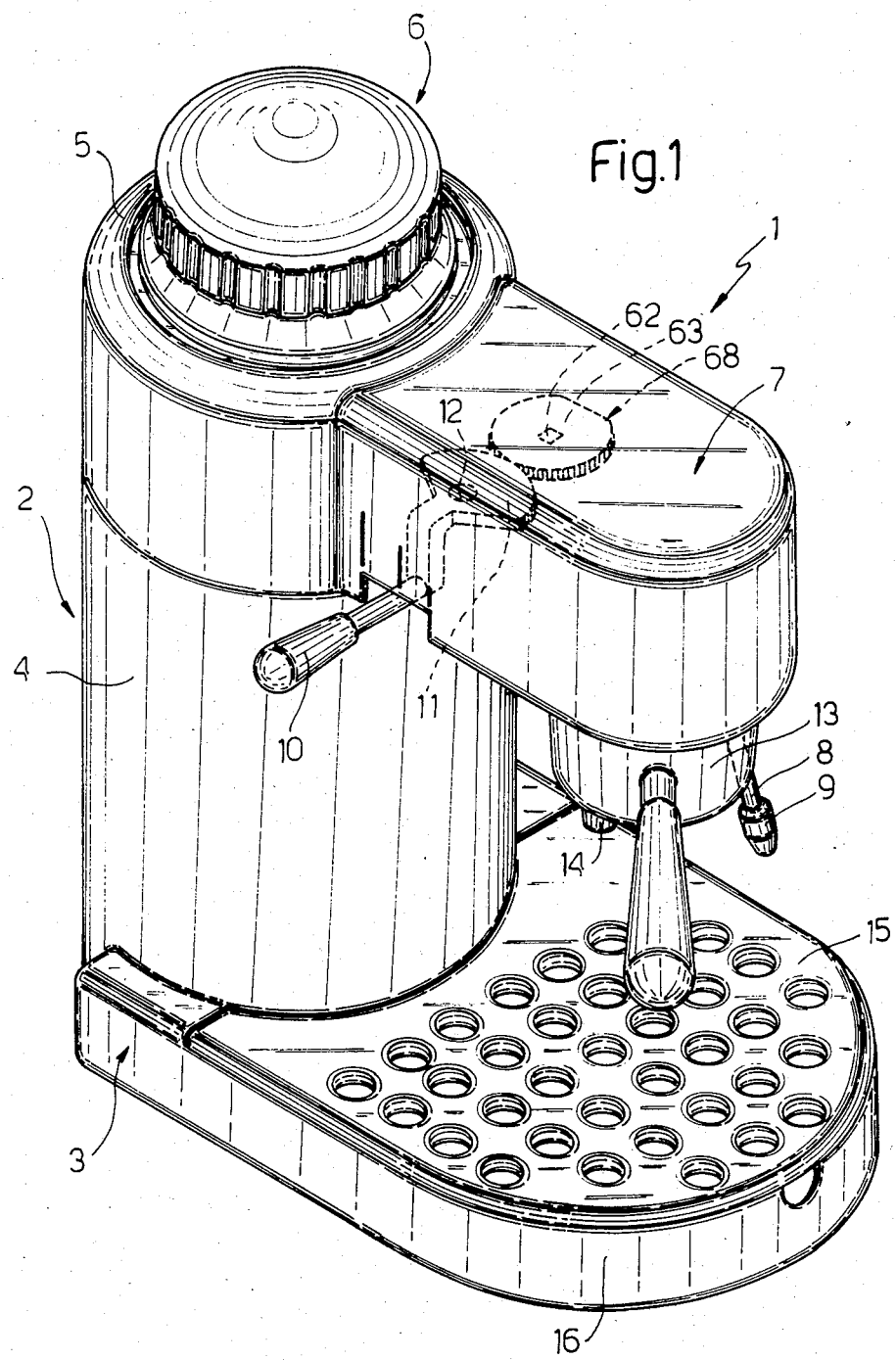
FIG. 1 shows a three-quarter top view in perspective of a coffee machine according to the present invention.

Number 1 in FIGS. 1 and 2 indicates a coffee machine comprising an outer casing 2, the latter, in turn, consisting of a hollow base 3, an essentially cylindrical upright 4 extending upwards from the rear end of base 3 and closed at the top by a cover 5 fitted on top with a cap 6, and an appendix 7 essentially in the form of a rectangular parallelepipedon projecting radially outwards from one end of upright 4.

From a first vertical side face of appendix 7 there projects outwards a pipe 8 terminating with a nozzle 9 for supplying essentially dry steam, whereas, from a second vertical side face of appendix 7, opposite the said first face, there projects laterally outwards a control lever 10 connected integral with a sector gear 11 located inside appendix 7 and designed to turn about its own axial pin 12 on appendix 7, in such a manner as to assume three distinct operating angles in relation to the said appendix 7.

Beneath the latter, a filtering cup 13, designed to hold enough ground coffee for making one or two cups, is connected in removable manner by means of a bayonet joint described in more detail later on. The said filtering cup 13 has two spouts 14 at the bottom (only one is shown in FIG. 1) for filling with coffee one or two cups (not shown) placed on a removable pierced plate 15 covering a compartment (not shown) formed inside a portion 16 of base 3 projecting frontwards from the base of upright 4. As shown in FIG. 2, upright 4 houses a boiler 17 consisting of a lower cup-shaped body 18 and an upper cup-shaped body 19, joined together with their concave sides facing. A bottom wall on body 18 presents an outer groove (not shown) housing an electric resistor 20 for heating boiler 17.

From a top wall 21 on upper body 19 there extends upwards a filler pipe 22 for filling boiler 17 with water. The said filler pipe 22 extends over the top of upright 4 and has an outer thread 23 on to which is screwed cap 6. As shown in FIG. 2, cap 6 comprises a first outer cup-shaped body 24 with its concave side facing downwards, and a second inner cup-shaped body 25 also arranged with its concave side facing downwards and housed inside the said body 24 with both axial and radial slack, in such a manner as to form, between the inner surface of body 24 and the outer surface of both a cylindrical side wall 26 and a bottom wall 27 on body 25, a continuous gap 28 communicating externally at the bottom. Gap 28 is also cupshaped with its concave side facing downwards and is only broken by a number of radial bridging elements 29 connecting body 25 to body 24.

A seal 30 rests on the inner surface of bottom wall 27, with which seal the free end of filler pipe 22 cooperates in fluidtight manner when the outer thread 23 of the said pipe 22 engages inner thread 31 on side wall 26 of cup-shaped body 25.

Wall 27 is provided internally with a hollow appendix 32 having a through axial hole 33 enabling communication between boiler 17 and gap 28 and controlled by a safety ball valve 34 designed to enable the steam inside boiler 17 to blow off inside gap 28 and, consequently, also externally, when the pressure inside boiler 17 exceeds a given level, usually 2.5 atm.

Appendix 7 houses a distributor indicated as a whole by 35 and connected to the outer surface of upper body 19 on boiler 17.

Figure 5:
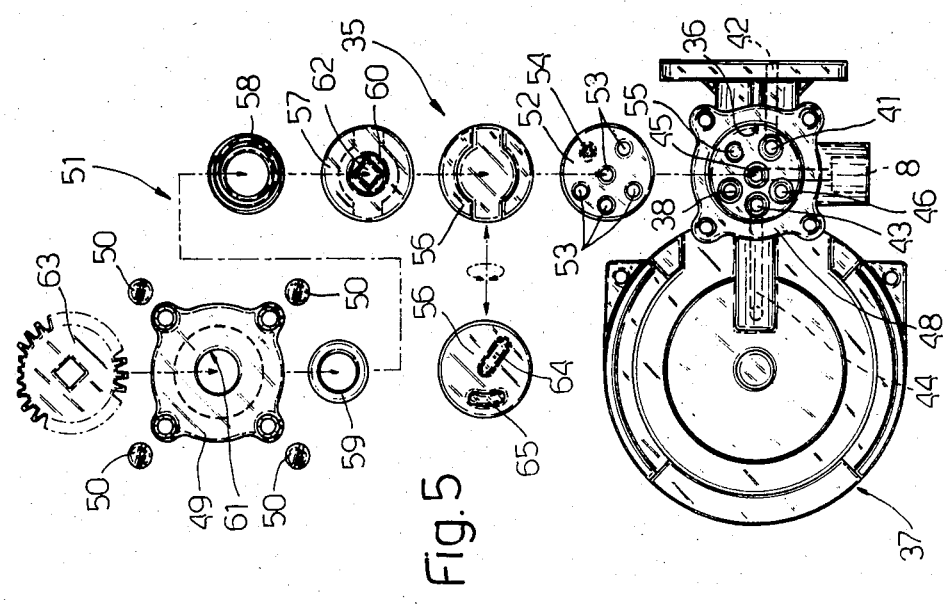
FIG. 5 shows an exploded plan view of the FIG. 3 detail.
Figure 3:
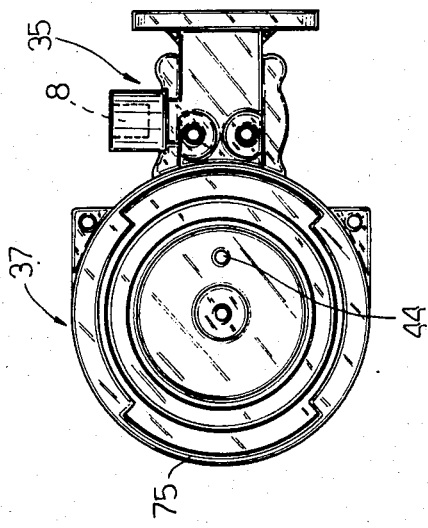
FIG. 3 shows a FIG. 2 detail as seen from underneath.
Figure 4:
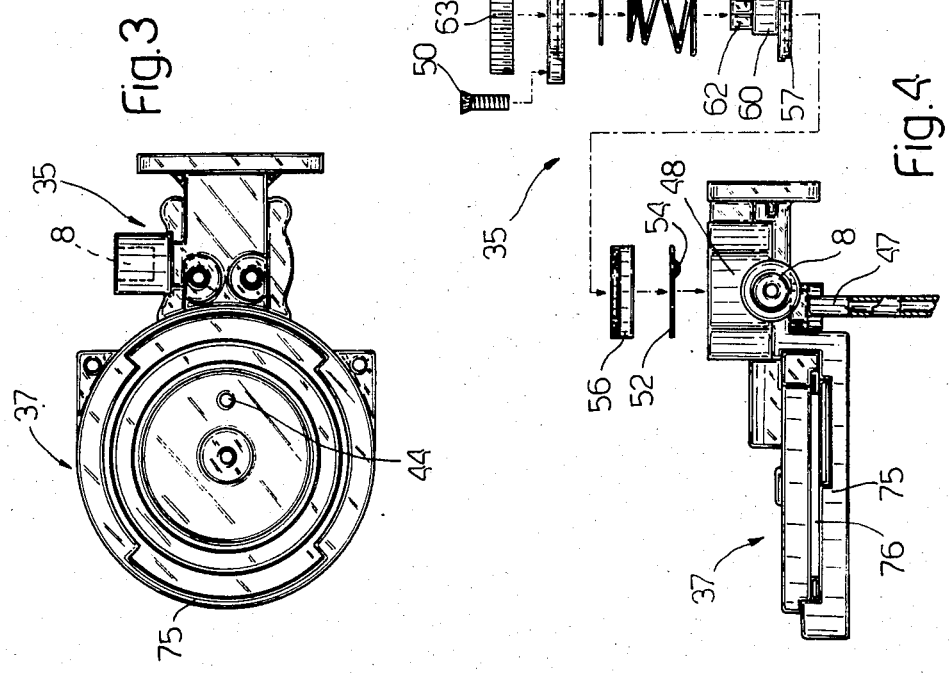
FIG. 4 shows an exploded side view of the FIG. 3 detail.

As shown, particularly in FIGS. 3, 4 and 5, distributor 35 comprises a distribution chamber or tank 36 to which is connected a cup-shaped cup-holder element 37 having its concave side facing downwards and supporting filtering cup 13. The bottom surface of chamber 36 presents a first inlet 38 communicating with the bottom end of lower body 18 on boiler 17 by means of an outer pipe 39 (FIG. 2) and a ball valve 40 located on pipe 39 and designed only to allow water to flow from boiler 17 to chamber 36 when the pressure inside boiler 17 exceeds a given leven, usually 1.5 atm.

The bottom surface of chamber 36 also presents a second inlet 41 communicating with boiler 17 via a pipe 42 which comes out inside the top end of boiler 17; a first outlet 43 communicating with cup-holder 37 via a water outlet pipe 44; a second outlet 45 communicating with nozzle 9 via steam outlet pipe 8; and a third exhaust outlet 46 communicating externally via an exhaust pipe 47 (FIG. 2) the free end of which comes out inside the tray (not shown) closed off by pierced plate 15.

Chamber 36 is defined by a circular bottom wall and a cylindrical side wall 48. The said second inlet 41 is formed through the centre of the said bottom wall, whereas the said first inlet 38 and the said outlets 43, 45 and 46 are formed in unevenly-spaced manner through the said bottom wall, about a circumference coaxial with the said second inlet 41.

As shown in FIGS. 4 and 5, chamber 36 is closed off at the top by a cover 49, secured to wall 48 by screws 50, and houses a selecting device indicated as a whole by 51 and comprising a disc 52 resting in fluidtight manner on the bottom inside surface of chamber 36. Disc 52 presents a number of holes 53 matching with inlets 38 and 41 and with outlets 43, 44 and 45, and is secured angularly in relation to chamber 36 by means of a boss 54 engaging inside a recess 55 on the bottom wall of chamber 36. Selecting device 51 also comprises a selecting disc 56 placed over disc 52 and designed to turn about its own axis in contact with the upper surface of disc 52. The upper surface of selecting disc 56 is fitted with a control plate 57 held contacting selecting disc 56 by a spring 58 pressed between plate 57 and cover 49 with a washer 59 inbetween. From the upper surface of plate 57, a pin 60 extends upwards and out of chamber 36 through a hole 61 in the centre of cover 49, the free end of the said pin 60 having a square head 62 fitted with a gear 63 connected to sector gear 11.

As shown in FIGS. 5 to 8, the underside of selecting disc 56 presents a first radial groove 64, for connecting second inlet 41 to second outlet 45 with selecting disc 56 in a given angular position; and a second curved groove 65, for selectively connecting first outlet 43 to first inlet 38 and third outlet 46, or for disconnecting first inlet 38 when the said first groove 64 connects second inlet 41 to second outlet 45.

As shown in FIGS. 6 to 8, the outer surface of gear 63 cooperates with a control element 66 controlling a microswitch 67 which is opened when gear 63 moves into a given angular position in relation to chamber 36, thus causing the said control element 66 to cooperate with faced section 68 on gear 63.

Microswitch 67 forms part of an electric control circuit 69 (FIG. 9) comprising a mains connecting plug 70, an on/off switch 71, an "on" indicator light 72 connected parallel and controlled solely by switch 71, a thermostat 72 series-connected to switch 71 and resistor 20 for disconnecting the latter if the temperature inside boiler 17 exceeds a given maximum threshold, usually of around 120°–130° C., and a temperature fuse 74 set to trip if the temperature inside boiler 17 exceeds a critical threshold, usually of around 210°–220° C.

As shown, particularly in FIG. 4, cup-holder 37 presents a downward-facing annular appendix 75 designed to receive the top end of filtering cup 13 and having slots 76 designed to enable bayonet connection of filtering cup 13 on to cup-holder 37.

The machine according to the present invention operates as follows. For making two cups of coffee, for example, plug 70 is connected to the mains, filtering cup 13 is removed from cup-holder 37 and filled with enough ground coffee for making two cups, boiler 17 is filled with water through filler pipe 22, cap 6 is screwed on and distributor 35 switched from the first stop setting shown in FIG. 6 to the coffee-making setting shown in FIG. 7.

Machine 1 may now be switched on by operating switch 71 so as to supply electric circuit 69. When distributor 35 is set as shown in FIG. 7, the bottom of boiler 17 communicates with filtering cup 13 via pipe 39, water inlet 38, groove 65, water outlet 43 and pipe 44. At the same time, control element 66 cooperates with the toothed surface of gear 63 in such a manner as to close microswitch 67 and so allow current to be supplied through resistor 20. As the latter heats up, it also heats the water and raises the pressure inside boiler 17. The water leaving boiler 17 along pipe 39 is prevented from reaching chamber 36 by valve 40 which is set to open at 1.5 atm. pressure.

By the time this pressure is reached, the water inside the boiler is over 100° C. and is therefore allowed to flow through chamber 36 to filtering cup 13 and, from there, into the cups out of spouts 14.

Once the required amount of coffee has been produced, the operator switches lever 10 so as to set distributor 35 to the stop position shown in FIG. 6. In this position, control element 66 contacts faced section 68 thus opening microswitch 67 and disconnecting resistor 20. At the same time, groove 65 shifts so as to connect water outlet 43 to exhaust 46 and so blow off the remaining pressure inside filtering cup 13. Allowing the operator to switch, at any time, to the stop position shown in FIG. 6 provides for a number of major advantages. Besides enabling the quality of the coffee to be controlled as required by regulating the amount of water forced through the ground coffee inside filtering cup 13, it also enables filtering cup 13 to be safely removed and refilled with coffee for making a further two cups, owing to the fact that boiler 17 holds more than enough water for making four normal-size cups of coffee.

The amount of water inside boiler 17 is also sufficient for supplying dry steam at any time, even after making four cups of coffee, by shifting lever 10 so as to set distributor 35 as shown in FIG. 8.

In this position, water inlet 38 is closed, steam inlet 41 is connected to steam outlet 45 and, consequently, also to pipe 8 and nozzle 9, whereas resistor 20 is kept energized by control element 66 keeping microswitch 67 closed.

Should thermostat 73 fail to operate, thus resulting in critical pressure of about 2.5 atm. inside boiler 17, valve 34 opens to blow the steam off downwards and out through gap 28, with no danger to the operator. Machine 1 may therefore be said to enable the operator not only to control the quality of the coffee as required, but also to produce fresh coffee and/or steam whenever required; unlike known coffee machines of the same type on which all the water in the boiler is forced through the coffee in one go, with no possibility of control on the part of the user, and with the result that the coffee produced is of mediocre quality and usually reheated. Filtering cup 13 may, of course, be fitted with a known type of volume limiting device (not shown) enabling the use of enough coffee for making one cup, which is therefore placed beneath both spouts 14.

I claim:

1. Coffee machine comprising a boiler, a heating source connected to the said boiler, a first outlet pipe extending from a bottom portion of the said boiler, a second outlet pipe extending from a top portion of the said boiler, a steam supply nozzle, a removable filtering cup containing sufficient ground coffee for producing at least one cup of drinking coffee, and a distributor located, on one side, between the said first and second pipes, and, on the other, between the said steam supply nozzle and the said filtering cup, characterised by the fact that the said distributor comprises a distribution chamber having a first and second inlet communicating with the said first and second pipes, and at least one first and second outlet communicating respectively with the said filtering cup and the said nozzle; and selecting means housed in mobile manner inside the said chamber for selectively assuming at least two distinct operating positions, in the first of which, the said first inlet communicates with the said first outlet, and in the second of which, the said second inlet communicates with the said second outlet; the size of the said boiler being such as to hold enough water for making at least twice the number of cups catered for by the ground coffee contained inside the said filtering cup.

2. Machine according to claim 1, characterised by the fact that it also comprises an exhaust and a third outlet located on the said distribution chamber and communicating with the said exhaust; the said selecting means being designed to assume a third operating position in which the said first and the said third outlets communicate; and control means being provided for disconnecting the said heating source when the said selecting means are set in the said third position.

3. Machine according to claim 2, characterised by the fact that the said control means are connected directly to the said selecting means.

4. Machine according to claim 3, characterised by the fact that the said selecting means comprise a distributing valve element mounted in rotary manner inside the said distribution chamber, a gear coaxial and integral with the said valve element, and external control means for selectively setting the said gear in three distinct positions corresponding respectively to the said three operating positions; the said control means being connected to the said gear and being controlled by cam means supported on the same.

5. Machine according to claim 1, characterised by the fact that it comprises a first valve device on the said first outlet pipe on the said boiler, the said valve device being set so as to prevent the said boiler from communicating with the said first inlet on the said distribution chamber when the pressure inside the said first pipe is below a given threshold.

6. Machine according to claim 5, characterised by the fact that the said given pressure threshold is about 1.5 atm.

7. Machine according to claim 1, characterised by the fact that it comprises a second valve device on the said boiler for exhausting the latter externally when the pressure inside the boiler exceeds a given safety threshold.

8. Machine according to claim 7, characterised by the fact that the said boiler comprises a top filling pipe and a removable cap fitted in fluidtight manner on to the said filling pipe; the said second valve device being fitted on the said cap.

9. Machine according to claim 8, characterised by the fact that the said cap comprises a first outer cup-shaped body with its concave side facing downwards, and a second inner cup-shaped body with its concave side facing downwards and housed inside the said first body with both radial and axial slack; bridging means extending between the outer surface of the said inner body and the inner surface of the said outer body for connecting the said inner and bouter bodies together; and the said second valve device being mounted through the bottom wall of the said inner body facing the bottom wall of the said outer body.

* * * * *